(12) United States Patent
Lee et al.

(10) Patent No.: US 10,854,870 B2
(45) Date of Patent: Dec. 1, 2020

(54) POSITIVE ELECTRODE ACTIVE MATERIAL FOR SECONDARY BATTERY, METHOD OF PREPARING THE SAME, AND SECONDARY BATTERY INCLUDING THE POSITIVE ELECTRODE ACTIVE MATERIAL

(71) Applicant: LG Chem, Ltd., Seoul (KR)

(72) Inventors: Sang Wook Lee, Daejeon (KR); Wang Mo Jung, Daejeon (KR); Seong Hoon Kang, Daejeon (KR); Byung Chun Park, Daejeon (KR); Ju Kyung Shin, Daejeon (KR); Sang Min Park, Daejeon (KR)

(73) Assignee: LG Chem, Ltd.

( * ) Notice: Subject to any disclaimer, the term of this patent is extended or adjusted under 35 U.S.C. 154(b) by 148 days.

(21) Appl. No.: 16/251,940

(22) Filed: Jan. 18, 2019

(65) Prior Publication Data
US 2019/0157658 A1    May 23, 2019

Related U.S. Application Data

(62) Division of application No. 15/548,281, filed as application No. PCT/KR2016/006467 on Jun. 17, 2016, now Pat. No. 10,243,201.

(30) Foreign Application Priority Data

Jun. 17, 2015 (KR) .......................... 10-2015-0086005
Oct. 20, 2015 (KR) .......................... 10-2015-0145942
Jun. 16, 2016 (KR) .......................... 10-2016-0075210

(51) Int. Cl.
  *H01M 4/13* (2010.01)
  *H01M 4/131* (2010.01)
  (Continued)

(52) U.S. Cl.
  CPC .......... *H01M 4/131* (2013.01); *C01G 53/006* (2013.01); *C01G 53/50* (2013.01); *H01M 2/10* (2013.01);
  (Continued)

(58) Field of Classification Search
  CPC ........ H01M 4/131; H01M 4/36; H01M 4/366; H01M 4/505; H01M 4/525; H01M 10/052;
  (Continued)

(56) References Cited

U.S. PATENT DOCUMENTS 6,306,787 B1 * 10/2001 Sato ....................... C01G 53/00
                                                          423/594.3
7,566,479 B2    7/2009 Besenhard et al.
(Continued)

FOREIGN PATENT DOCUMENTS

CN    103548189 A    1/2014
CN    103988348 A    8/2014
(Continued)

OTHER PUBLICATIONS

Extended European Search Report including Written Opinion for EP16811976 dated Apr. 3, 2018.
(Continued)

*Primary Examiner* — Raymond Alejandro
(74) *Attorney, Agent, or Firm* — Lerner, David, Littenberg, Krumholz & Mentlik, LLP

(57) ABSTRACT

The present invention provides a method of preparing a positive electrode active material for a secondary battery including preparing a first transition metal-containing solution including a nickel raw material, a cobalt raw material, and a manganese raw material and a second transition metal-containing solution including a nickel raw material, a cobalt raw material, and a manganese raw material in a
(Continued)

concentration different from that of the first transition metal-containing solution; preparing a reaction solution, in which nickel manganese cobalt-based composite metal hydroxide particles are formed, by adding an ammonium cation-containing complexing agent and a basic compound as well as the second transition metal-containing solution to the first transition metal-containing solution and performing a co-precipitation reaction in a pH range of 11 to 13.

8 Claims, 2 Drawing Sheets

(51) Int. Cl.
*C01G 53/00* (2006.01)
*H01M 4/36* (2006.01)
*H01M 2/10* (2006.01)
*H01M 4/505* (2010.01)
*H01M 4/525* (2010.01)
*H01M 10/052* (2010.01)
*H01M 4/02* (2006.01)

(52) U.S. Cl.
CPC .............. *H01M 4/36* (2013.01); *H01M 4/366* (2013.01); *H01M 4/505* (2013.01); *H01M 4/525* (2013.01); *H01M 10/052* (2013.01); *C01P 2002/50* (2013.01); *C01P 2002/52* (2013.01); *C01P 2002/54* (2013.01); *C01P 2004/03* (2013.01); *C01P 2004/10* (2013.01); *C01P 2004/20* (2013.01); *C01P 2004/22* (2013.01); *C01P 2004/50* (2013.01); *C01P 2004/51* (2013.01); *C01P 2004/54* (2013.01); *C01P 2004/61* (2013.01); *C01P 2004/84* (2013.01); *C01P 2006/40* (2013.01); *H01M 2004/028* (2013.01)

(58) Field of Classification Search
CPC .......... H01M 2004/028; C01G 53/006; C01G 53/50; C01P 2002/50; C01P 2002/54; C01P 2004/03; C01P 2004/10; C01P 2004/20; C01P 2004/22; C01P 2004/50; C01P 2004/51; C01P 2004/54; C01P 2004/61; C01P 2004/84; C01P 2006/40
See application file for complete search history.

(56) References Cited

U.S. PATENT DOCUMENTS

| | | | | |
|---|---|---|---|---|
| 2004/0091414 | A1* | 5/2004 | Fittock | C01G 51/04 423/420.2 |
| 2004/0200998 | A1 | 10/2004 | Park et al. | |
| 2009/0029253 | A1 | 1/2009 | Itou et al. | |
| 2009/0325075 | A1 | 12/2009 | Tsuchiya et al. | |
| 2011/0042609 | A1 | 2/2011 | Park et al. | |
| 2013/0149608 | A1 | 6/2013 | Kim et al. | |
| 2013/0202966 | A1 | 8/2013 | Yu et al. | |
| 2013/0337331 | A1 | 12/2013 | Mori et al. | |
| 2013/0344391 | A1 | 12/2013 | Yushin et al. | |
| 2014/0011090 | A1* | 1/2014 | Toya | H01M 4/505 429/223 |
| 2014/0027670 | A1 | 1/2014 | Sun et al. | |
| 2014/0087263 | A1 | 3/2014 | Matsumoto et al. | |
| 2014/0113190 | A1 | 4/2014 | Kong et al. | |
| 2014/0158932 | A1 | 6/2014 | Sun et al. | |
| 2014/0205901 | A1 | 7/2014 | Nagai et al. | |
| 2014/0335417 | A1 | 11/2014 | Nagai | |
| 2014/0342229 | A1 | 11/2014 | Kwak et al. | |
| 2015/0064557 | A1 | 3/2015 | Kim et al. | |
| 2015/0311523 | A1* | 10/2015 | Okato | H01M 4/52 429/223 |
| 2015/0357638 | A1 | 12/2015 | Sun et al. | |
| 2016/0093885 | A1 | 3/2016 | Kamata et al. | |
| 2016/0133922 | A1 | 5/2016 | Uhm et al. | |
| 2016/0141607 | A1 | 5/2016 | Park et al. | |
| 2016/0190573 | A1 | 6/2016 | Sun et al. | |
| 2016/0218350 | A1 | 7/2016 | Noh et al. | |
| 2017/0222221 | A1 | 8/2017 | Park et al. | |
| 2018/0048015 | A1 | 2/2018 | Lee et al. | |

FOREIGN PATENT DOCUMENTS

| | | |
|---|---|---|
| CN | 104521039 A | 4/2015 |
| EP | 2882013 A1 | 6/2015 |
| EP | 3028995 A1 | 6/2016 |
| EP | 3249723 A1 | 11/2017 |
| JP | 4726896 B2 | 7/2011 |
| JP | 2013051172 A | 3/2013 |
| JP | 2013120752 A | 6/2013 |
| JP | 2013134871 A | 7/2013 |
| JP | 2014006963 A | 1/2014 |
| JP | 2014506388 A | 3/2014 |
| JP | 2015072800 A | 4/2015 |
| KR | 20030083476 A | 10/2003 |
| KR | 20110083383 A | 7/2011 |
| KR | 20120079801 A | 7/2012 |
| WO | 2006115272 A1 | 11/2006 |
| WO | 2012131779 A1 | 10/2012 |
| WO | 2012165654 A1 | 12/2012 |
| WO | 2013192205 A1 | 12/2013 |
| WO | 2014119973 A1 | 8/2014 |
| WO | 2014181891 A1 | 11/2014 |
| WO | 2015012640 A1 | 1/2015 |
| WO | 2015016647 A1 | 2/2015 |
| WO | 2015030401 A1 | 3/2015 |

OTHER PUBLICATIONS

Jang-Yeon Hwang et al., Radially aligned hierarchical columnar structure as a cathode material for high energy density sodium-ion batteries, Nature Communications, vol. 6, No. 1, pp. 1-9, Apr. 17, 2015, XP 055446508.
Search report from International Application No. PCT/KR2016/006467, dated Sep. 12, 2016.
Chinese Search Report for Application No. CN 201680012016.1 dated Jan. 19, 2020, 1 page.

* cited by examiner

POSITIVE ELECTRODE ACTIVE MATERIAL FOR SECONDARY BATTERY, METHOD OF PREPARING THE SAME, AND SECONDARY BATTERY INCLUDING THE POSITIVE ELECTRODE ACTIVE MATERIAL

CROSS-REFERENCE TO RELATED APPLICATIONS

This application is a divisional of U.S. application Ser. No. 15/548,281, filed Aug. 2, 2017 which is a national phase entry under 35 U.S.C. § 371 of International Application No. PCT/KR2016/006467 filed Jun. 17, 2016, which claims priority from Korean Patent Application No. 10-2015-0086005, filed on Jun. 17, 2015, Korean Patent Application No. 10-2015-0145942, filed Oct. 20, 2015, and Korean Patent Application No. 10-2016-0075210, filed Jun. 16, 2016, the disclosures of which are incorporated herein by reference.

TECHNICAL FIELD

The present invention relates to a positive electrode active material for a secondary battery, a method of preparing the same, and a secondary battery including the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Also, a lithium cobalt-based oxide, which is easily synthesized and has an excellent electrochemical performance including life characteristics, has been mainly used as a positive electrode active material for a lithium secondary battery. As portable devices, such as a mobile phone and a tablet PC, become smaller and smaller, high capacity and high energy as well as miniaturization have been required for batteries applied thereto. In order to increase energy per unit volume of the battery, packing density of an active material may be increased or a voltage may be increased. Furthermore, in order to increase the packing density, it is desirable to use an active material with a large particle size. However, since the active material with a large particle size has a relatively low surface area, an active area in contact with an electrolyte solution is also narrow. Since the narrow active area acts negatively on kinetics, relatively low rate capability and initial capacity are obtained.

DISCLOSURE OF THE INVENTION

Technical Problem

An aspect of the present invention provides a positive electrode active material for a secondary battery having high output and long life characteristics and a method of preparing the same.

Another aspect of the present invention provides a positive electrode, a lithium secondary battery, a battery module, and a battery pack which include the positive electrode active material.

Another aspect of the present invention provides a precursor suitable for the preparation of the positive electrode active material and a method of preparing the same.

Technical Solution

According to an aspect of the present invention, there is provided a positive electrode active material for a secondary battery including: a core; a shell disposed to surround the core; and a buffer layer which is disposed between the core and the shell and includes pores and a three-dimensional network structure connecting the core and the shell, wherein the core, the shell, and the three-dimensional network structure of the buffer layer each independently include a lithium nickel manganese cobalt-based composite metal oxide, and at least one metallic element of the nickel, the manganese, and the cobalt has a concentration gradient that gradually changes in any one region of the core, the shell, and the entire positive electrode active material.

According to another aspect of the present invention, there is provided a method of preparing the positive electrode active material for a secondary battery including: preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution; preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13; growing the nickel manganese cobalt-based composite metal hydroxide particles by adding an ammonium cation-containing complexing agent and a basic compound to the reaction solution until a pH of the reaction solution reaches 8 or more to less than 11; and mixing the grown nickel manganese cobalt-based composite metal hydroxide particles with a lithium-containing raw material and performing a heat treatment.

According to another aspect of the present invention, there is provided a positive electrode for a secondary battery including the above-described positive electrode active material.

According to another aspect of the present invention, there is provided a lithium secondary battery including the positive electrode.

According to another aspect of the present invention, there is provided a method of preparing a precursor of the positive electrode active material for a secondary battery including: preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution; preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13; and growing the nickel manganese cobalt-based composite metal hydroxide particles by adding an ammonium cation-containing complexing agent and a basic compound to the reaction solution until a pH of the reaction solution reaches 8 or more to less than 11.

According to another aspect of the present invention, there is provided a precursor of the positive electrode active material for a secondary battery including: a core, and a shell disposed to surround the core, wherein the core and the shell each independently include a nickel manganese cobalt-based composite metal hydroxide, at least one metallic element of the nickel, the manganese, and the cobalt has a concentration gradient that gradually changes in any one region of the core, the shell, and the entire precursor, and the nickel manganese cobalt-based composite metal hydroxide included in the shell has a radial crystal orientation from a center of a precursor particle in a surface direction.

Advantageous Effects

With respect to a positive electrode active material for a secondary battery according to the present invention, since a buffer layer of a network-structured lithium composite metal oxide, which is connected to a core and a shell, is further formed between the core and the shell of a particle having a core-shell structure and a distribution of nickel, cobalt, and manganese in the active material particle is controlled, destruction of the active material due to a rolling process during the preparation of an electrode is minimized and reactivity with an electrolyte solution is maximized. In addition, since particles constituting the shell have a crystal structure aligned for facilitating intercalation and deintercalation of lithium ions, output characteristics and life characteristics of the secondary battery may be improved. Accordingly, the positive electrode active material according to the present invention is suitable for a positive electrode active material of batteries requiring high capacity, long lifetime, and thermal stability, such as batteries for automobiles or batteries for power tools, particularly, batteries requiring the minimization of performance degradation at a high voltage, such as the batteries for automobiles.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

| [Description of the Symbols] | |
|---|---|
| 1: Core | 2: Shell |
| 3: Buffer layer | 3a: Pore |
| 3b: Three-dimensional network structure | 10: Positive electrode active material |

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery according to an embodiment of the present invention includes:

a core;

a shell disposed to surround the core; and a buffer layer which is disposed between the core and the shell and includes pores and a three-dimensional network structure connecting the core and the shell, wherein the core, the shell, and the three-dimensional network structure of the buffer layer each independently include a lithium nickel manganese cobalt-based composite metal oxide, and at least one metallic element of the nickel, the manganese, and the cobalt has a concentration gradient that gradually changes in any one region of the core, the shell, and the entire positive electrode active material.

Thus, with respect to the positive electrode active material for a secondary battery according to the embodiment of the present invention, since the three-dimensional network-structured buffer layer, which is connected to the core and the shell, is further formed between the core and the shell of a particle having a core-shell structure and a distribution of nickel, cobalt, and manganese in the active material particle is controlled, destruction of the active material due to a rolling process during the preparation of an electrode is minimized and reactivity with an electrolyte solution is maximized. Also, since particles constituting the shell have a crystal structure aligned for facilitating intercalation and deintercalation of lithium ions, output characteristics and life characteristics of the secondary battery may be improved.

Figure 1:
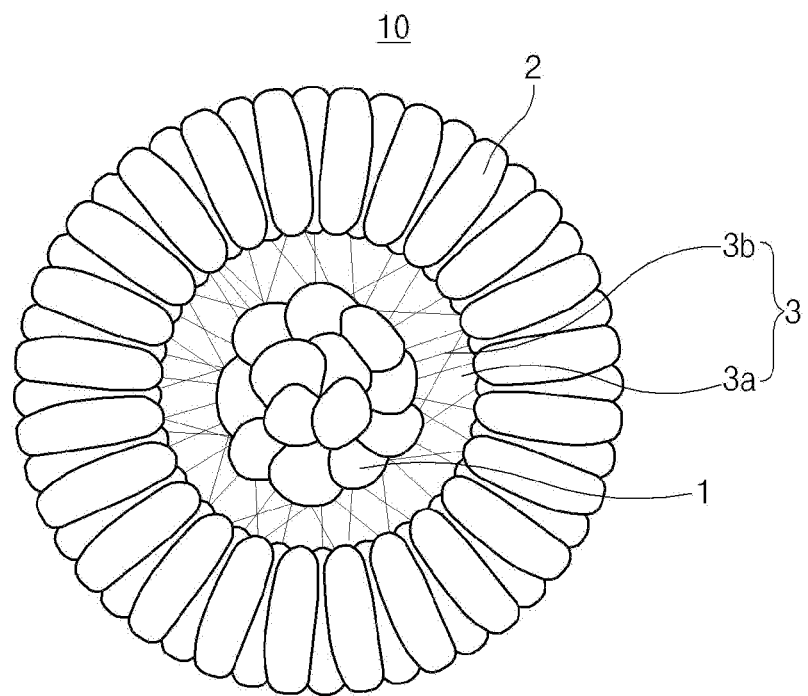
FIG. 1 is a cross-sectional structural view schematically illustrating a positive electrode active material for a secondary battery according to an embodiment of the present invention.

FIG. 1 is a cross-sectional structural view schematically illustrating the positive electrode active material for a secondary battery according to the embodiment of the present invention. FIG. 1 is only an example for describing the present invention and the scope of the present invention is not limited thereto.

Referring to FIG. 1, a positive electrode active material 10 for a secondary battery according to the embodiment of the present invention includes a core 1, a shell 2 surrounding the core, and a buffer layer 3 disposed between the core and the shell to surround the core, wherein the buffer layer 3 includes pores 3a and a three-dimensional network structure 3b.

Specifically, in the positive electrode active material 10, the core 1 includes a lithium nickel manganese cobalt-based composite metal oxide (hereinafter, simply referred to as 'first lithium composite metal oxide') as a compound capable of reversibly intercalating and deintercalating lithium (lithiated intercalation compound).

The core 1 may be composed of a single particle of the first lithium composite metal oxide, or may be composed of a secondary particle in which primary particles of the first lithium composite metal oxide are agglomerated. In this case, the primary particles may be uniform, or may be non-uniform.

Also, in the positive electrode active material 10, the shell 2 includes a lithium nickel manganese cobalt-based composite metal oxide (hereinafter, simply referred to as 'second lithium composite metal oxide') as a compound capable of reversibly intercalating and deintercalating lithium (lithiated intercalation compound).

The second lithium composite metal oxide may be crystal oriented particles radially grown from a center of the positive electrode active material in a surface direction. Thus, since the particles of the second lithium composite metal oxide constituting the shell have a crystal orientation in a direction facilitating the intercalation and deintercalation of lithium, higher output characteristics may be achieved in comparison to particles not having the same crystal orientation.

Specifically, in the shell 2, the particles of the second lithium composite metal oxide may have various shapes such as those of a polygon, such as a hexahedron, a cylinder, a fiber, or a flake. Specifically, the particles of the second lithium composite metal oxide may have a fibrous shape having an aspect ratio of 1.5 or more. In a case in which the aspect ratio of the particles of the second lithium composite metal oxide constituting the shell is less than 1.5, since particle growth may be non-uniform, electrochemical properties may be deteriorated. In this case, the aspect ratio denotes a ratio of a length in a major axis direction of the second lithium composite metal oxide particle to a length in a minor axis direction thereof. Also, the shell 2 may further include pores formed between the particles of the second lithium composite metal oxide.

The buffer layer 3, which includes the pores 3a and the three-dimensional network structure 3b connecting the core and the shell, is disposed between the core 1 and the shell 2.

In the buffer layer 3, the pores 3a are formed in a process of forming the buffer layer having the three-dimensional network structure between the core and the shell of the active material particle by controlling a pH of a reactant during the preparation of the active material, wherein, since the pores 3a form spaces in the network structure between the core 1 and the shell 2, the pores 3a have a buffer action during rolling for the preparation of the electrode. Also, since the pores allow the electrolyte solution to easily penetrate into the active material to be able to react with the core, the pores play a role in increasing a reaction area of the active material with respect to the electrolyte solution. The pores 3a may be included in an amount of 30 vol % or less, for example, 2 vol % to 30 vol %, based on a total volume of the positive electrode active material. When the pores are included within the above range, the pores may have an excellent buffer action without a decrease in mechanical strength of the active material and an effect of increasing the reaction area with respect to the electrolyte solution. The pores, for example, may be included in an amount of 5 vol % to 20 vol % in consideration of the significant improvement effect due to the pore formation. In this case, porosity of the buffer layer may be measured by cross-sectional analysis of the particle using a focused ion beam (FIB) or mercury intrusion porosimetry.

Furthermore, in the buffer layer 3, the three-dimensional network structure 3b is formed in a process of forming the inner core during the preparation of the active material, wherein the three-dimensional network structure 3b is connected between the core and the shell to play a role in supporting the space between the core 1 and the shell 2. Accordingly, similar to the core 1 and the shell 2, the three-dimensional network structure 3b includes a lithium nickel manganese cobalt-based composite metal oxide (hereinafter, simply referred to as 'third lithium composite metal oxide') as a compound capable of reversibly intercalating and deintercalating lithium (lithiated intercalation compound).

Also, in the positive electrode active material 10 having a structure as described above, the first to third lithium composite metal oxides of the core, shell, and buffer layer may each independently include a compound of the following Formula 1:

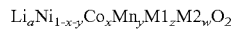  [Formula 1]

(in Formula 1, M1 includes at least one element selected from the group consisting of tungsten (W), molybdenum (Mo), and chromium (Cr), M2 includes at least one element selected from the group consisting of aluminum (Al), zirconium (Zr), titanium (Ti), magnesium (Mg), tantalum (Ta), and niobium (Nb), $1.0 \leq a \leq 1.5$, $0 < x \leq 0.5$, $0 < y \leq 0.5$, $0 \leq z \leq 0.03$, $0 \leq w \leq 0.02$, and $0 < x+y < 1$).

A composition of the compound of Formula 1 is an average composition of each of the first to third lithium composite metal oxides of the core, shell, or buffer layer.

In the lithium composite metal oxide of Formula 1, lithium (Li) may be included in an amount corresponding to a, that is, $1.0 \leq a \leq 1.5$. When a is less than 1.0, there is a concern that capacity may be reduced, and, when a is greater than 1.5, since the particles are sintered in a sintering process, the preparation of the active material may be difficult. The Li, for example, may be included in an amount satisfying $1.0 \leq a \leq 1.5$, in consideration of balance between a significant capacity characteristics improvement effect due to the control of the amount of the Li and sinterability during the preparation of the active material.

Furthermore, in the lithium composite metal oxide of Formula 1, nickel (Ni) may be included in an amount corresponding to $1-x-y$, and, in this case, $0 < x+y < 1$. Specifically, in Formula 1, the amount of Ni may satisfy $0.3 \leq 1-x-y < 1$. In a case in which $1-x-y$ is less than 0.3, there is a concern that the capacity characteristics may be degraded, and, in a case in which $1-x-y$ is greater than 1, there is a concern that high-temperature stability may be reduced. The Ni, for example, may be included in an amount satisfying $0.3 \leq 1-x-y \leq 0.8$, in consideration of the excellent capacity characteristics and stability improvement effect due to the inclusion of the Ni.

Also, in the lithium composite metal oxide of Formula 1, cobalt (Co) may be included in an amount corresponding to x, that is, $0 < x \leq 0.5$. In a case in which x in the lithium composite metal oxide of Formula 1 is greater than 0.5, costs may be increased. The Co, for example, may be included in an amount satisfying $0.10 \leq x \leq 0.35$, in consideration of the significant capacity characteristics improvement effect due to the inclusion of the Co.

Furthermore, in the lithium composite metal oxide of Formula 1, manganese (Mn) may improve structural stability of the active material and, as a result, may improve stability of the battery. The Mn may be included in an amount corresponding to y, that is, $0<y\leq0.5$. In a case in which y in the lithium composite metal oxide of Formula 1 is greater than 0.5, output characteristics and capacity characteristics of the battery may be degraded. The Mn, for example, may be included in an amount satisfying $0.10\leq y\leq 0.30$, in consideration of a significant battery characteristics improvement effect due to the inclusion of the Mn element.

Also, M1 in the lithium composite metal oxide of Formula 1, as at least one element selected from the group consisting of W, Mo, and Cr, plays a role in suppressing particle growth in the sintering process during the preparation of the active material particle. The M1 may be present in a position, at which the Ni, Co, or Mn element should be present, by substituting a portion of the Ni, Co, or Mn in a crystal structure of the positive electrode active material, or may form a lithium oxide by reacting with lithium. Accordingly, since a size of grains is controlled by controlling an amount and time of addition of M1, the output and life characteristics of the battery may be further improved. The M1 may be included in an amount corresponding to z, that is, $0\leq z\leq 0.03$. In a case in which z is greater than 0.03, distortion or collapse of the crystal structure may be induced, and battery capacity may be reduced by preventing movements of lithium ions. The M1, for example, may be included in an amount satisfying $0.005\leq z\leq 0.01$, in consideration of realization of the particle structure due to the control of the amount of the M1 and the resulting significant battery characteristics improvement effect.

Furthermore, the Ni, Co, and Mn elements in the lithium composite metal oxide of Formula 1 may be partially substituted or doped with another element, that is, M2, to improve the battery characteristics by controlling the distribution of the metallic elements in the active material. The M2 may specifically be at least one element selected from the group consisting of Al, Zr, Ti, Mg, Ta, and Nb. Among the above-described M2 elements, the Al may improve the life characteristics of the battery by maintaining an average oxidation number of the active material. The M2 element may be included in an amount corresponding to w, that is, $0\leq w\leq 0.02$, within a range in which characteristics of the active material are not degraded.

With respect to the positive electrode active material according to the embodiment of the present invention including the first to third lithium composite metal oxides having the above-described composition, in the entire active material on the average in Formula 1, $1.0\leq a\leq 1.5$, $0<x\leq 0.5$, $0<y\leq 0.5$, $0\leq z\leq 0.03$, $0\leq w\leq 0.02$, and $0<x+y<0.5$, and, for example, the positive electrode active material according to the embodiment of the present invention may be a Ni excess compound in which $1.0\leq a\leq 1.15$, $0.10\leq x\leq 0.35$, $0.10\leq y\leq 0.30$, $0\leq z\leq 0.03$, $0\leq w\leq 0.02$, and $0<x+y\leq 0.4$.

Also, the at least one metallic element of the nickel, the manganese, and the cobalt included in the positive electrode active material 10 may have a concentration gradient that gradually changes in any one region of the core, the shell, and the entire active material particle. Specifically, the nickel, the cobalt, and the manganese included in the positive electrode active material may be increased or decreased while respectively having concentration gradients that gradually change from the center of the positive electrode active material particle to the surface thereof, or in the core and the shell. In this case, a concentration gradient slope of the metallic element may be constant, that is, the slope may be a single value.

In the present invention, the expression "the concentration of the metal has a gradually changing gradient" in any one region of the core and the shell of the positive electrode active material and the entire positive electrode active material particle denotes that the metal has a concentration distribution in which the concentration of the metal is gradually changed across the entire particle. Specifically, in the concentration distribution, the metal concentration per 1 µm in the particle may have a difference of 0.1 at % to 30 at %, particularly 0.1 at % to 20 at %, and more particularly 1 at % to 10 at % based on a total atomic weight of the corresponding metal included in the positive electrode active material.

Furthermore, in the present invention, the concentration gradient structure and concentration of the metal in the positive electrode active material particle may be identified by using a method such as electron probe microanalysis (EPMA), inductively coupled plasma-atomic emission spectroscopy (ICP-AES), or time of flight secondary ion mass spectrometry (ToF-SIMS), and, specifically, an atomic ratio of each metal may be measured by EPMA while moving from the center of the positive electrode active material to the surface thereof.

As described above, since the metal is allowed to have a concentration gradient in which the concentration of the metal is gradually changed according to the position in the positive electrode active material particle, an abrupt phase boundary region is not present from the center to the surface, and thus, its crystal structure is stabilized and thermal stability is increased. Also, in a case in which the concentration gradient slope of the metal is constant, the effect of improvement in the structural stability may be further improved. Furthermore, since the concentration of each metal in the active material particle is changed by the concentration gradient, the effect of the positive electrode active material on the improvement of the battery performance may be further improved by easily using properties of the corresponding metal.

Specifically, in the positive electrode active material according to the embodiment of the present invention, the at least one metallic element of the nickel, the manganese, and the cobalt may have a concentration gradient that gradually changes across the entire active material particle, and the concentration gradient slope of the metallic element in the active material particle may have one or more values.

Also, in the positive electrode active material according to the embodiment of the present invention, the at least one metallic element of the nickel, the manganese, and the cobalt may each independently have a concentration gradient that gradually changes in the core and the shell, and the concentration gradient slopes of the metallic element in the core and the shell may be the same or different.

Specifically, in the positive electrode active material according to the embodiment of the present invention, the concentration of the nickel included in the positive electrode active material may be decreased while the nickel has a gradual concentration gradient from the center of the active material particle in the surface direction of the particle; or may be decreased while the nickel has a gradual concentration gradient from the center of the active material particle in the surface direction of the particle in each of the core and the shell. In this case, a concentration gradient slope of the nickel may be constant from the center of the positive electrode active material particle to the surface thereof, or in each of the core and the shell. In a case in which the nickel has a concentration gradient in which a high concentration of the nickel is maintained at the particle center in the active material particle and the concentration is decreased from the center of the particle to the surface thereof, a decrease in capacity may be prevented while thermal stability is obtained.

Also, in the positive electrode active material according to the embodiment of the present invention, the concentration of the manganese included in the positive electrode active material may be increased while the manganese has a gradual concentration gradient from the center of the active material particle in the surface direction of the particle; or may be increased while the manganese has a gradual concentration gradient from the center of the active material particle in the surface direction of the particle in each of the core and the shell. In this case, a concentration gradient slope of the manganese may be constant from the center of the positive electrode active material particle to the surface thereof, or in each of the core and the shell. In a case in which the manganese has a concentration gradient in which a low concentration of the manganese is maintained at the particle center in the active material particle and the concentration is increased from the center of the particle to the surface thereof, excellent thermal stability may be obtained without a decrease in capacity.

Furthermore, in the positive electrode active material according to the embodiment of the present invention, the concentration of the cobalt included in the positive electrode active material may be increased while the cobalt has a gradual concentration gradient from the center of the active material particle in the surface direction of the particle; or may be increased while the cobalt has a gradual concentration gradient from the center of the active material particle in the surface direction of the particle in each of the core and the shell. In this case, a concentration gradient slope of the cobalt may be constant from the center of the positive electrode active material particle to the surface thereof, or in each of the core and the shell. In a case in which the cobalt has a concentration gradient in which a low concentration of the cobalt is maintained at the particle center in the active material particle and the concentration is increased from the center of the particle to the surface thereof, the decrease in capacity may be prevented while reducing the amount of the cobalt used.

Also, in the positive electrode active material according to the embodiment of the present invention, the amount of the nickel included in the core may be greater than the amount of the nickel included in the shell, the core may specifically include the nickel in an amount of 60 mol % or more to less than 100 mol % based on a total mole of the metallic elements (except lithium) included in the core, and the shell may include the nickel in an amount of 30 mol % or more to less than 60 mol % based on a total mole of the metallic elements (except lithium) included in the shell.

Furthermore, in the positive electrode active material according to the embodiment of the present invention, the amount of the manganese included in the core may be smaller than the amount of the manganese included in the shell.

Also, in the positive electrode active material according to the embodiment of the present invention, the amount of the cobalt included in the core may be smaller than the amount of the cobalt included in the shell.

Furthermore, in the positive electrode active material according to the embodiment of the present invention, the nickel, the manganese, and the cobalt each independently may have a gradually changing concentration gradient across the entire active material particle, the concentration of the nickel may be decreased while the nickel has a gradual concentration gradient from the center of the active material particle in the surface direction, and the concentrations of the cobalt and the manganese may be increased while the cobalt and the manganese each independently have a gradual concentration gradient from the center of the active material particle in the surface direction.

Also, in the positive electrode active material according to the embodiment of the present invention, the nickel, the manganese, and the cobalt each independently may have a concentration gradient that gradually changes in the core and the shell, the concentration of the nickel may be decreased while the nickel has a gradual concentration gradient from the center of the core to an interface between the core and the buffer layer and from an interface between the buffer layer and the shell to a surface of the shell, and the concentrations of the cobalt and the manganese may be increased while the cobalt and the manganese each independently have a gradual concentration gradient from the center of the core to the interface between the core and the buffer layer and from the interface between the buffer layer and the shell to the surface of the shell.

Thus, since the positive electrode active material according to the embodiment of the present invention has a combined concentration gradient, in which the concentration of the nickel is decreased and the concentrations of the manganese and cobalt are increased from the center to the surface of the positive electrode active material particle, partially in the active material or across the entire active material, thermal stability may be obtained while maintaining the capacity characteristics.

The positive electrode active material having the above-described structure may have an average particle diameter ($D_{50}$) of 2 μm to 20 μm in consideration of specific surface area and positive electrode material mixture density. In a case in which the average particle diameter of the positive electrode active material is less than 2 μm, there is a concern that dispersion in the active material layer may be reduced due to the agglomeration of the positive electrode active material, and, in a case in which the average particle diameter of the positive electrode active material is greater than 20 μm, there is a concern that the mechanical strength and specific surface area of the positive electrode active material may be reduced. Also, the positive electrode active material may have an average particle diameter ($D_{50}$) of 3 μm to 15 μm in consideration of an effect of improvement in rate capability and initial capacity characteristics due to its unique structure. In the present invention, the average particle diameter ($D_{50}$) of the positive electrode active material may be defined as a particle diameter at 50% in a cumulative particle diameter distribution. For example, the average particle diameter ($D_{50}$) of the positive electrode active material according to the embodiment of the present invention may be measured by using a laser diffraction method. Specifically, in the method of measuring the average particle diameter ($D_{50}$) of the positive electrode active material, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about kHz and an output of 60 W, and the average particle diameter ($D_{50}$) at 50% in a cumulative particle diameter distribution of the measurement instrument may then be calculated.

Also, in the positive electrode active material, a ratio of a radius of the core to a radius of the positive electrode active material may be greater than 0 to less than 0.4, particularly 0.01 to 0.2, and more particularly 0.1 to 0.2, and a ratio of a length from the center of the positive electrode active material to the interface between the buffer layer and the shell to the radius of the positive electrode active material may be greater than 0 to less than 0.7, particularly 0.01 to 0.5, and more particularly 0.1 to 0.3.

Furthermore, in the positive electrode active material, when a ratio of a thickness of the shell to the radius of the positive electrode active material is referred to as a shell region, the shell region determined according to the following Equation 1 may be in a range of 0.2 to 1, particularly 0.25 to 0.7, and more particularly 0.5 to 0.6.

Shell region=(radius of positive electrode active material-core radius-buffer layer thickness)/radius of positive electrode active material [Equation 1]

In a case in which the core, the buffer layer, and the shell are formed in the positive electrode active material at the above-described ratios and the concentration gradient of the metallic element is formed in each region, the destruction of the positive electrode active material due to the rolling process during the preparation of the electrode is minimized and the reactivity with the electrolyte solution is maximized by further optimizing and controlling the distribution of the nickel, the cobalt, and the manganese in the active material particle, and thus, the output characteristics and life characteristics of the secondary battery may be further improved.

In the present invention, a diameter of the core portion may be measured by particle section analysis using a forced ion beam (FIB).

The positive electrode active material having the above structure according to the embodiment of the present invention may be prepared by a method including the steps of: preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution (step 1); preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13 (step 2); growing the nickel manganese cobalt-based composite metal hydroxide particles by adding an ammonium cation-containing complexing agent and a basic compound to the reaction solution until a pH of the reaction solution reaches 8 or more to less than 11 (step 3); and mixing the grown nickel manganese cobalt-based composite metal hydroxide particles with a lithium-containing raw material and performing a heat treatment (step 4).

Thus, according to another embodiment of the present invention, provided is a method of preparing the positive electrode active material.

Hereinafter, each step will be described in detail, and, in the method of preparing the positive electrode active material, step 1 is a step of preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution.

The second transition metal-containing solution may be prepared in the same manner as the first transition metal-containing solution except that the second transition metal-containing solution includes nickel, cobalt, and manganese in a concentration different from that of the first transition metal-containing solution. Specifically, each of the first transition metal-containing solution and the second transition metal-containing solution may be prepared by adding a nickel raw material, a cobalt raw material, a manganese raw material, and selectively, raw materials of other metals (M1 or M2) (in this case, M1 is at least one element selected from the group consisting of W, Mo, and Cr, and M2 is at least one element selected from the group consisting of Al, Zr, Ti, Mg, Ta, and Nb) to a solvent, particularly water, or a mixture of water and an organic solvent (specifically, alcohol etc.) which may be uniformly mixed with the water, or solutions, particularly aqueous solutions, including the each metal-containing raw materials are prepared, and these solutions may then be mixed and used.

An each metallic element-containing acetic acid salt, nitrate, sulfate, halide, sulfide, hydroxide, oxide, or oxyhydroxide may be used as the metal, such as nickel, cobalt, and manganese, -containing raw materials, and the metal-containing raw materials are not particularly limited as long as the materials may be dissolved in water.

For example, the cobalt raw material may include $Co(OH)_2$, CoOOH, $Co(OCOCH_3)_2 \cdot 4H_2O$, $Co(NO_3)_2 \cdot 6H_2O$, or $Co(SO_4)_2 \cdot 7H_2O$, and any one thereof or a mixture of two or more thereof may be used.

Also, the nickel raw material may include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and any one thereof or a mixture of two or more thereof may be used.

Furthermore, the manganese raw material may include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and any one thereof or a mixture of two or more thereof may be used.

Also, in a case in which the finally prepared precursor or active material further includes M1 or M2 (in this case, M1 is at least one element selected from the group consisting of W, Mo, and Cr, and M2 is at least one element selected from the group consisting of Al, Zr, Ti, Mg, Ta, and Nb), the M1 or M2-containing raw material may be further selectively added during the preparation of the first and second transition metal-containing solutions in step 1.

The M1 or M2-containing raw material may include an acetic acid salt, nitrate, sulfate, halide, sulfide, hydroxide, oxide, or oxyhydroxide including the M1 or M2 element, and any one thereof or a mixture of two or more thereof may be used. For example, in a case in which M1 is W, a tungsten oxide may be used. The M1 or M2-containing raw material may be used within a range which may satisfy a content condition of the M1 and M2 elements in the finally prepared precursor.

Next, in the method of preparing the positive electrode active material, step 2 is a step of preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13.

In step 2, since reaction rate and reaction time are controlled while gradually increasing an amount of the second transition metal-containing solution added to the first transition metal-containing solution, a precursor, which includes a nickel manganese cobalt-based composite metal hydroxide and has a concentration gradient in which the nickel, the cobalt, and the manganese each independently are gradually changed from the center of the particle to the surface thereof, may be prepared by a single co-precipitation reaction process. The concentration gradient of the metal in the precursor prepared in this case and its slope may be easily adjusted by compositions and a mixed feed ratio of the first transition metal-containing solution and the second transition metal-containing solution. In order to produce a high density state in which the concentration of the specific metal is high, it is describable to increase the reaction time and decrease the reaction rate, and, in order to produce a low density state in which the concentration of the specific metal is low, it is describable to decrease the reaction time and increase the reaction rate.

Specifically, a rate of the second transition metal-containing solution added to the first transition metal-containing solution may be gradually increased within a range of 1% to 30% of an initial feed rate. Specifically, a feed rate of the first transition metal-containing solution may be in a range of 150 ml/hr to 210 ml/hr, the feed rate of the second transition metal-containing solution may be in a range of 120 ml/hr to 180 ml/hr, and the feed rate of the second transition metal-containing solution may be gradually increased within a range of 1% to 30% of the initial feed rate and within the above feed rate range. In this case, the reaction may be performed in a temperature range of 40° C. to 70° C.

Also, diameters of the precursor and the positive electrode active material particle may be controlled by adjusting the amount of the second transition metal-containing solution added to the first transition metal-containing solution and the reaction time. Specifically, it is desirable to appropriately adjust the amount of the second transition metal-containing solution added and the reaction time to obtain the above-described particle diameter of the positive electrode active material.

In step 2, the ammonium cation-containing complexing agent may specifically include $NH_4OH$, $(NH_4)_2SO_4$, $NH_4NO_3$, $NH_4Cl$, $CH_3COONH_4$, or $NH_4CO_3$, and any one thereof or a mixture of two or more thereof may be used. Also, the ammonium cation-containing complexing agent may be used in the form of an aqueous solution, and, in this case, water or a mixture of water and an organic solvent (specifically, alcohol etc.), which may be uniformly mixed with the water, may be used as a solvent.

The ammonium cation-containing complexing agent may be added in an amount such that a molar ratio of the ammonium cation-containing complexing agent to 1 mole of a mixture of the first and second transition metal-containing solutions becomes 0.5 to 1. In general, a chelating agent reacts with metal at a molar ratio equal to or greater than 1:1 to form a complex, but, since an unreacted complex, which does not react with a basic aqueous solution, among the formed complex may be changed into an intermediate product to be recovered and reused as the chelating agent, the amount of the chelating agent used may be reduced in the present invention, in comparison to a conventional case. As a result, crystallinity of the positive electrode active material may be increased and stabilized.

Furthermore, the basic compound may include a hydroxide of alkali metal or alkaline earth metal, such as NaOH, KOH, or $Ca(OH)_2$, or a hydrate thereof, and any one thereof or a mixture of two or more thereof may be used. The basic compound may also be used in the form of an aqueous solution, and, in this case, water or a mixture of water and an organic solvent (specifically, alcohol etc.), which may be uniformly mixed with the water, may be used as a solvent.

Also, the co-precipitation reaction for the formation of the transition metal-containing hydroxide particles may be performed under a condition in which a pH of the mixed transition metal raw material-containing aqueous solution is in a range of 11 to 13. In a case in which the pH is outside the above range, there is a concern that the diameter of the prepared precursor may be changed or particle breakage may occur. Furthermore, since metal ions are eluted on the surface of the precursor, there is a concern that various oxides may be formed by a side reaction. Specifically, the co-precipitation reaction may be performed under a condition in which the pH of the transition metal raw material-containing aqueous solution is in a range of 11 to 12.

In order to satisfy the above-described pH range, the ammonium cation-containing complexing agent and the basic compound may be used in a molar ratio of 1:10 to 1:2. In this case, the pH value denotes a pH value measured at a liquid temperature of 25° C.

Also, the co-precipitation reaction may be performed in a temperature range of 40° C. to 70° C. in an inert atmosphere such as nitrogen or argon. Furthermore, a stirring process may be selectively performed to increase the reaction rate during the reaction, and, in this case, a stirring speed may be in a range of 100 rpm to 2,000 rpm.

Nickel manganese cobalt-based composite metal hydroxide particles, as the precursor, are formed and precipitated in the reaction solution by the above-described process. The precipitated precursor may be separated by a typical method, a drying process may then be selectively performed, and, in this case, the drying process may be performed in a temperature range of 110° C. to 400° C. for 15 hours to 30 hours.

Next, in the method of preparing the positive electrode active material, step 3 is a process of growing the nickel manganese cobalt-based composite metal hydroxide particles prepared in step 2.

Specifically, the nickel manganese cobalt-based composite metal hydroxide particles may be grown by adding the ammonium cation-containing complexing agent and the basic compound to the reaction solution, in which the nickel manganese cobalt-based composite metal hydroxide particles are formed, until the pH of the reaction solution is lower than the pH during the co-precipitation reaction.

Specifically, a total amount of moles of nickel ions, cobalt ions, and manganese ions may be in a range of 0.5 M to 2.5 M, or 1 M to 2.2 M. Also, in order to maintain such an ion concentration, it is desirable to gradually provide the transition metal raw materials depending on a precipitation rate of the transition metal hydroxide.

Furthermore, the growing of the nickel manganese cobalt-based composite metal hydroxide particles in step 3 may be performed at a pH, which is lower than the pH in the formation of the nickel manganese cobalt-based composite metal hydroxide particles in step 2, and, specifically, may be performed in a pH range of 8 or more to less than 11, for example, in a pH range of 8 to 10.5, which is lower than the pH in step 2.

The growing of the nickel manganese cobalt-based composite metal hydroxide particles may be performed by changing the pH of the reactant at a rate of 1/hr to 2.5/hr by controlling the feed rates of the materials added, specifically, the ammonium cation-containing complexing agent and the basic compound. Since the growing of the nickel manganese cobalt-based composite metal hydroxide particles is performed at the pH, which is lower than the pH during the co-precipitation reaction, and the above-described pH change rate, a desired particle structure may be easily formed.

Also, when adding the ammonium cation-containing complexing agent and the basic compound to the reaction solution in which the nickel manganese cobalt-based composite metal hydroxide particles are formed, the ammonium cation-containing complexing agent and the basic compound may be added at the same rate, or may be added while the feed rates are gradually reduced. In a case in which the ammonium cation-containing complexing agent and the basic compound are added while the feed rates are reduced, the ammonium cation-containing complexing agent and the basic compound may be added while the feed rates are reduced at a reduction rate of 20% or more to less than 100%.

As described above, since the feed rates and concentrations of the ammonium cation-containing complexing agent and the basic compound and the reaction temperature are controlled, the precipitation rate of the nickel manganese cobalt-based composite metal hydroxide in the particle growing step is allowed to be faster than the precipitation rate of the nickel manganese cobalt-based composite metal hydroxide in step 2. As a result, density near an outer surface of the nickel manganese cobalt-based composite metal hydroxide particles, which become the precursor, is decreased to facilitate particle growth during the subsequent heat treatment process.

Furthermore, crystals of the inside of the precursor particle and crystals of the outside of the particle formed by the subsequent particle growth may have different properties from each other through the control of the above-described conditions. Accordingly, during the preparation of the positive electrode active material using the precursor, since the crystals of the inside, which are formed when the pH is high during the heat treatment process after the mixing with the lithium raw material, shrink and the crystals formed at low pH and temperature grow, the shrunken crystals form the core and the crystals grown outside form the shell. In addition, since the core and the shell are formed as described above, pores may be formed between the core and the shell and, at the same time, crystals disposed between the core and the shell may form the three-dimensional network structure connecting the inside and the outside of the particle.

Also, the process of step 3 may be performed in an inert atmosphere.

After the process of step 3, the grown nickel manganese cobalt-based composite metal hydroxide particles are separated from the reaction solution, and processes of washing and drying may then be selectively further performed. The drying process may be performed by a typical drying method, and may be specifically performed by a method such as heating in a temperature range of 100° C. to 120° C. or hot air injection.

Furthermore, after the process of step 3, a heat treatment process for the grown nickel manganese cobalt-based composite metal hydroxide particles may be selectively performed.

The heat treatment process for the nickel manganese cobalt-based composite metal hydroxide particles may be performed in an air atmosphere or oxidizing atmosphere (e.g., $O_2$ etc.), and, for example, may be performed in an oxidizing atmosphere. Also, the heat treatment process may be performed in a temperature range of 250° C. to 1,000° C. The heat treatment process may be performed under the above-described temperature condition for 5 hours to 48 hours, or 10 hours to 20 hours.

Also, the heat treatment process may be performed in multiple stages, i.e., two stages or three stages, to maintain the concentration gradient and particle orientation. Specifically, the heat treatment process may be performed by a method in which the nickel manganese cobalt-based composite metal hydroxide particles are maintained at 250° C. to 450° C. for 5 hours to 15 hours, at 450° C. to 600° C. for 5 hours to 15 hours, and at 700° C. to 900° C. for 5 hours to 15 hours.

Furthermore, a water-removing agent may be further selectively added during the heat treatment of the nickel manganese cobalt-based composite metal hydroxide. Specifically, the water-removing agent may include citric acid, tartaric acid, glycolic acid, or maleic acid, and any one thereof or a mixture of two or more thereof may be used. The water-removing agent may be used in an amount of 0.01 mol to 0.2 mol based on 1 mol of the nickel manganese cobalt-based composite metal hydroxide.

The crystal structure of the core-shell and the concentration gradient of the metallic element in the nickel manganese cobalt-based composite metal hydroxide particles formed and grown through step 2 and step 3 are fixed by the heat treatment process as described above. Also, since the crystals of the outside of the particle are radially grown from the center of the particle to the outside, i.e., in the surface direction, crystal orientation is further fixed.

As a result of the above-described preparation process, a precursor suitable for the preparation of the positive electrode active material is prepared, in which the precursor includes a core; and a shell surrounding the core, wherein the core and the shell each independently include a lithium nickel manganese cobalt-based composite metal hydroxide, and at least one metallic element of the nickel, the manganese, and the cobalt has a concentration gradient that gradually changes in any one region of the core, the shell, and the entire precursor.

Thus, according to another embodiment of the present invention, provided is a positive electrode active material precursor prepared by the above preparation method.

Specifically, the precursor may include a nickel manganese cobalt-based composite metal hydroxide of the following Formula 2:

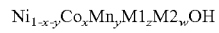

$Ni_{1-x-y}Co_xMn_yM1_zM2_wOH$     [Formula 2]

(in Formula 2, M1 includes at least one element selected from the group consisting of W, Mo, and Cr, M2 includes at least one element selected from the group consisting of Al, Zr, Ti, Mg, Ta, and Nb, 0<x≤0.5, 0<y≤0.5, 0≤z≤0.03, 0≤w≤0.02, and 0<x+y<1, particularly 0<x≤0.5, 0<y≤0.5, 0≤z≤0.03, 0≤w≤0.02, and 0<x+y≤0.7, and more particularly 0<x≤0.5, 0<y≤0.5, 0.002≤z≤0.03, 0≤w≤0.02, and 0<x+y≤0.4).

A composition of the nickel manganese cobalt-based composite metal hydroxide of Formula 2 is an average composition of the entire precursor.

Specifically, the precursor includes a core and a shell disposed to surround the core, wherein the core and the shell each independently include the nickel manganese cobalt-based composite metal hydroxide of Formula 2, at least one metallic element of the nickel, the manganese, and the cobalt has a concentration gradient that gradually changes in any one region of the core, the shell, and an entire precursor particle, and the nickel manganese cobalt-based composite metal hydroxide included in the shell has a radial crystal orientation from a center of the precursor particle in a surface direction. Also, the precursor may further include a buffer layer, which is disposed between the core and the shell and includes pores and a three-dimensional network structure connecting the core and the shell, according to conditions during the heat treatment process.

Specifically, the nickel, the cobalt, and the manganese included in the precursor may be increased or decreased while respectively having concentration gradients that gradually change from the center of the precursor particle to the surface thereof, or in the core and the shell. In this case, a concentration gradient slope of the metallic element may be constant.

In the present invention, the expression "the concentration of the metal has a gradually changing gradient" in the precursor denotes that the metal has a concentration distribution in which the concentration of the metal is gradually changed across the entire precursor particle. Specifically, in the concentration distribution, the metal concentration per 1 μm in the particle has a difference of 0.1 at % to 30 at %, particularly 0.1 at % to 20 at %, and more particularly 1 at % to 10 at % based on a total atomic weight of the corresponding metal included in the precursor.

Furthermore, in the present invention, the concentration gradient structure and concentration of the metal in the precursor particle may be identified by using a method such as electron probe microanalysis (EPMA), inductively coupled plasma-atomic emission spectroscopy (ICP-AES), or time of flight secondary ion mass spectrometry (ToF-SIMS), and, specifically, an atomic ratio of each metal may be measured by EPMA while moving from the center of the precursor to the surface thereof.

As described above, since the metal is allowed to have a concentration gradient in which the concentration of the metal is continuously changed according to the position in the precursor particle, an abrupt phase boundary region is not present from the center to the surface, and thus, its crystal structure is stabilized and thermal stability is increased. Also, in a case in which the concentration gradient slope of the metal is constant, the effect of improvement in the structural stability may be further improved. Furthermore, since the concentration of each metal in the active material particle is changed by the concentration gradient, the effect of the positive electrode active material on the improvement of the battery performance may be further improved by easily using the properties of the corresponding metal.

Next, in the method of preparing the positive electrode active material, step 4 is a step of mixing the nickel manganese cobalt-based composite metal hydroxide particles grown in step 3 with a lithium-containing raw material and performing a heat treatment to prepare a positive electrode active material having a structure in which the core-shell is formed by disposing the buffer layer between the core and the shell.

The lithium-containing raw material may include a lithium-containing carbonate (e.g., lithium carbonate etc.), hydrate (e.g., lithium hydroxide monohydrate (LiOH.H$_2$O) etc.), hydroxide (e.g., lithium hydroxide etc.), nitrate (e.g., lithium nitrate (LiNO$_3$) etc.), or chloride (e.g., lithium chloride (LiCl) etc.), and any one thereof or a mixture of two or more thereof may be used. Also, an amount of the lithium-containing raw material used may be determined according to amounts of the lithium and the transition metal in the finally prepared lithium composite metal oxide.

Also, a sintering agent may be further selectively added during the mixing of the nickel manganese cobalt-based composite metal hydroxide with the lithium-containing raw material. The sintering agent may specifically be an ammonium ion-containing compound such as NH$_4$F, NH$_4$NO$_3$, or (NH$_4$)$_2$SO$_4$; a metal oxide such as B$_2$O$_3$ or Bi$_2$O$_3$; or a metal halide such as NiCl$_2$ or CaCl$_2$, and any one thereof or a mixture of two or more thereof may be used. The sintering agent may be used in an amount of 0.01 mol to 0.2 mol based on 1 mol of the precursor. If the amount of the sintering agent is excessively low at less than 0.01 mol, an effect of improvement in sintering characteristics of the precursor may be insignificant, and, if the amount of the sintering agent is excessively high at greater than 0.2 mol, there is a concern that performance of the positive electrode active material may be reduced and initial capacity of the battery may be reduced during charging and discharging due to the excessive amount of the sintering agent.

Furthermore, a water-removing agent may be further selectively added during the mixing of the nickel manganese cobalt-based composite metal hydroxide with the lithium-containing raw material. Specifically, the water-removing agent may include citric acid, tartaric acid, glycolic acid, or maleic acid, and any one thereof or a mixture of two or more thereof may be used. The water-removing agent may be used in an amount of 0.01 mol to 0.2 mol based on 1 mol of the precursor.

The heat treatment process for the mixture of the nickel manganese cobalt-based composite metal hydroxide particles and the lithium-containing raw material may be performed in an air atmosphere or oxidizing atmosphere (e.g., O$_2$ etc.), and, for example, may be performed in an oxidizing atmosphere. Also, the heat treatment process may be performed in a temperature range of 250° C. to 1,000° C. The heat treatment process may be performed under the above-described temperature condition for 5 hours to 48 hours, or 10 hours to 20 hours.

Also, the heat treatment process may be performed in multiple stages, i.e., two stages or three stages, by adding a low-temperature sintering process to maintain the concentration gradient and particle orientation. Specifically, the heat treatment process may be performed by a method in which the mixture is maintained at 250° C. to 450° C. for 5 hours to 15 hours, at 450° C. to 600° C. for 5 hours to 15 hours, and at 700° C. to 900° C. for 5 hours to 15 hours.

With respect to the nickel manganese cobalt-based composite metal hydroxide particles formed and grown through steps 2 and 3, crystals of the inside of the particle and crystals of the outside of the particle formed by the subsequent particle growth have different properties due to a difference in process conditions, i.e., pH etc., during the preparation process. That is, the crystals of the inside, which are formed when the pH is high, shrink during the above-described heat treatment process, and the crystals formed at low pH and temperature grow. As a result, the shrunken crystals form the core, and the crystals grown outside form the shell. Since the core and the shell are formed as described above, pores may be formed between the core and the shell, and, at the same time, crystals disposed between the core and the shell may form the three-dimensional network structure connecting the inside and the outside of the particle. Also, the crystals of the outside of the particle radially grow from the center of the particle to the outside to have a crystal orientation.

Since the positive electrode active materiel prepared according to the above-described preparation method includes the buffer layer including pores between the core and shell by controlling the pH, concentration, and rate of the reactant, there is no risk of active material destruction during the rolling in an electrode preparation process, and reactivity with an electrolyte solution is maximized. In addition, since the particles constituting the shell have a crystal structure aligned for facilitating intercalation and deintercalation of lithium ions, resistance of the secondary battery may be reduced and life characteristics of the secondary battery may be improved. Simultaneously, since the distribution of the transition metal is controlled across the entire active material particle, high capacity, long lifetime, and thermal stability may be obtained when the positive electrode active materiel is used in the battery and, at the same time, performance degradation at a high voltage may be minimized.

Thus, according to another embodiment of the present invention, provided are a positive electrode and a lithium secondary battery which include the above-described positive electrode active material.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer including the above-described positive electrode active material and selectively, the binder and the conductive agent is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500

µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate; pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Also, according to another embodiment of the present invention, provided are a precursor suitable for the preparation of the above-described positive electrode active material and a method of preparing the same.

Specifically, the precursor according to an embodiment of the present invention may be prepared by a method including the steps of: preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution (step 2-1); preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13 (step 2-2); and growing the nickel manganese cobalt-based composite metal hydroxide particles by adding an ammonium cation-containing complexing agent and a basic compound to the reaction solution until a pH of the reaction solution reaches 8 or more to less than 11 (step 2-3). In the method of preparing the precursor, steps 2-1 to 2-3 may be performed in the same manner as steps 1 to 3 in the previous method of preparing the positive electrode active material, a detailed description will be omitted.

As a result of the above-described preparation process, a precursor suitable for the preparation of the positive electrode active material is prepared, in which the precursor includes a core; and a shell surrounding the core, wherein the core and the shell each independently include a lithium nickel manganese cobalt-based composite metal hydroxide, and at least one metallic element of the nickel, the manganese, and the cobalt has a concentration gradient that gradually changes in any one region of the core, the shell, and the entire precursor.

Specifically, the precursor may include a nickel manganese cobalt-based composite metal hydroxide of the following Formula 2:

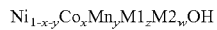  [Formula 2]

(in Formula 2, M1 includes at least one element selected from the group consisting of W, Mo, and Cr, M2 includes at least one element selected from the group consisting of Al, Zr, Ti, Mg, Ta, and Nb, $0<x\le0.5$, $0<y\le0.5$, $0\le z\le0.03$, $0\le w\le0.02$, and $0<x+y<1$, particularly $0<x\le0.5$, $0<y\le0.5$, $0\le z\le0.03$, $0\le w\le0.02$, and $0<x+y\le0.7$, and more particularly $0<x\le0.5$, $0<y\le0.5$, $0.002\le z\le0.03$, $0\le w\le0.02$, and $0<x+y\le0.4$).

Specifically, the precursor includes a core and a shell disposed to surround the core, wherein the core and the shell each independently include the nickel manganese cobalt-based composite metal hydroxide of Formula 2, at least one metallic element of the nickel, the manganese, and the cobalt has a concentration gradient that gradually changes in any one region of the core, the shell, and the entire precursor, and the nickel manganese cobalt-based composite metal hydroxide included in the shell has a radial crystal orientation from a center of a precursor particle in a surface direction. Also, the precursor may further include a buffer layer, which is disposed between the core and the shell and includes pores and a three-dimensional network structure connecting the core and the shell, according to conditions during a heat treatment process.

Specifically, the nickel, the cobalt, and the manganese included in the precursor may be increased or decreased while respectively having concentration gradients that gradually change from the center of the precursor particle to the surface thereof, or in the core and the shell. In this case, a concentration gradient slope of the metallic element may be constant. Specifically, in the precursor prepared by the preparation method according to the embodiment of the present invention, the at least one metallic element of the nickel, the manganese, and the cobalt may have a concentration gradient that gradually changes across the entire precursor particle, and the concentration gradient slope of the metallic element in the precursor particle may have one or more values.

Also, in the precursor, the at least one metallic element of the nickel, the manganese, and the cobalt may each independently have a concentration gradient that gradually changes in the core and the shell, and the concentration gradient slopes of the metallic element in the core and the shell may be the same or different.

For example, in the precursor, the concentration of the nickel included in the precursor may be gradually decreased while the nickel has a concentration gradient from the center of the precursor particle in the surface direction of the particle; or may be gradually decreased while the nickel has a concentration gradient from the center of the precursor particle in the surface direction of the particle in each of the core and the shell. In this case, a concentration gradient slope of the nickel may be constant from the center of the precursor particle to the surface thereof, or in each of the core and the shell. In a case in which the nickel has a concentration gradient in which a high concentration of the nickel is maintained at the particle center in the precursor particle and the concentration is decreased from the center of the particle to the surface thereof, the thermal stability of the positive electrode active material may be improved.

Also, in the precursor, the concentration of the manganese included in the precursor may be gradually increased while the manganese has a concentration gradient from the center of the precursor particle in the surface direction of the particle; or may be gradually increased while the manganese has a concentration gradient from the center of the precursor particle in the surface direction of the particle in each of the core and the shell. In this case, a concentration gradient slope of the manganese may be constant from the center of the precursor particle to the surface thereof, or in each of the core and the shell. In a case in which the manganese has a concentration gradient in which a low concentration of the manganese is maintained at the particle center in the precursor particle and the concentration is increased from the center of the particle to the surface thereof, the thermal stability may be improved without a decrease in capacity of the positive electrode active material.

Furthermore, in the precursor, the concentration of the cobalt in the precursor may be gradually increased while the cobalt has a concentration gradient from the center of the precursor particle in the surface direction of the particle; or may be gradually increased while the cobalt has a concentration gradient from the center of the precursor particle in the surface direction of the particle in each of the core and the shell. In this case, a concentration gradient slope of the cobalt may be constant from the center of the precursor particle to the surface thereof, or in each of the core and the shell. In a case in which the cobalt has a concentration gradient in which a low concentration of the cobalt is maintained at the particle center in the precursor particle and the concentration is increased from the center of the particle to the surface thereof, capacity characteristics of the positive electrode active material may be improved while reducing the amount of the cobalt used.

Also, in the precursor, an amount of the nickel included in the core may be greater than an amount of the nickel included in the shell, the core may specifically include the nickel in an amount of 70 mol % or more to less than 100 mol % based on a total mole of the metallic elements included in the core, and the shell may include the nickel in an amount of 30 mol % or more to less than 75 mol % based on a total mole of the metallic elements included in the shell under the above-described nickel content condition in the core and the shell.

Furthermore, in the precursor, an amount of the manganese included in the core may be smaller than an amount of the manganese included in the shell.

Also, in the precursor, an amount of the cobalt included in the core may be smaller than an amount of the cobalt included in the shell.

Furthermore, in the precursor, the nickel, the manganese, and the cobalt each independently may have a gradually changing concentration gradient across the entire precursor particle, the concentration of the nickel may be gradually decreased while the nickel has a concentration gradient from the center of the precursor particle in the surface direction, and the concentrations of the cobalt and the manganese may be gradually increased while the cobalt and the manganese each independently have a concentration gradient from the center of the precursor particle in the surface direction.

Thus, since the precursor has a combined concentration gradient, in which the concentration of the nickel is decreased and the concentrations of the manganese and cobalt are increased from the center to the surface of the precursor particle, partially in the precursor or across the entire precursor, the thermal stability may be improved while maintaining the capacity characteristics of the positive electrode active material during the preparation of the positive electrode active material.

The precursor may have an average particle diameter ($D_{50}$) of 3 μm to 20 μm in consideration of a specific surface area of the finally prepared positive electrode active material and positive electrode material mixture density. In a case in which the average particle diameter ($D_{50}$) of the precursor is less than 3 μm, there is a concern that the agglomeration of the precursor may occur, and, in a case in which the average particle diameter of the precursor is greater than 20 μm, there is a concern that mechanical strength and specific surface area of the precursor may be reduced. Also, the precursor may have an average particle diameter ($D_{50}$) of 3 μm to 15 μm in consideration of an effect of improvement in rate capability and initial capacity characteristics of the positive electrode active material due to its unique structure.

In the present invention, the average particle diameter ($D_{50}$) of the precursor may be defined as a particle diameter at 50% in a cumulative particle diameter distribution. For example, the average particle diameter ($D_{50}$) of the precursor may be measured by using a laser diffraction method, in which, specifically, particles of the precursor are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, in the precursor, the core may be a secondary particle in which primary particles of the nickel manganese cobalt-based composite metal hydroxide are agglomerated. Furthermore, in the precursor, a ratio of a radius of the core to a radius of the precursor particle may be greater than 0 to less than 0.5, particularly greater than 0 to less than 0.4, and more particularly 0.01 to 0.2, or 0.1 to 0.2.

Also, in the precursor, when a ratio of a thickness of the shell to the radius of the precursor particle is referred to as a shell region, the shell region determined according to the following Equation 2 may be in a range of 0.2 to 1, particularly 0.25 to 0.7, and more particularly 0.5 to 0.6.

$$\text{Shell region} = (\text{radius of precursor} - \text{core radius})/\text{radius of precursor} \quad \text{[Equation 2]}$$

In a case in which the core and the shell are formed in the precursor at the above-described ratios and the concentration gradient of the metallic element is formed in each region, the destruction of the active material due to the rolling process during the preparation of the electrode is minimized and the reactivity with the electrolyte solution is maximized by further optimizing and controlling the distribution of the nickel, the cobalt, and the manganese in the active material particle, and thus, the output characteristics and life characteristics of the secondary battery may be further improved.

In the present invention, a diameter of the core portion may be measured by particle section analysis using a forced ion beam (FIB).

Thus, since the positive electrode active material precursor prepared by the method according to the embodiment of the present invention may have improved mechanical strength by controlling the distribution of the nickel, the cobalt, and the manganese in the particle having a core-shell structure, the destruction of the active material due to the rolling process during the preparation of the electrode may be minimized. Also, since the three-dimensional network structured buffer layer connected to the core and the shell is further formed due to a density difference between the core and the shell during the subsequent heat treatment for the preparation of the positive electrode active material, the reactivity of the active material with the electrolyte solution may be maximized due to the unique structure in which the three-dimensional network structure and the pores are included in the buffer layer. In addition, since the particles constituting the shell have a crystal structure aligned for facilitating intercalation and deintercalation of lithium ions, the output characteristics and life characteristics of the secondary battery may be improved.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1: Preparation of Precursor and Positive Electrode Active Material

In a 5 L batch-type reactor set at 60° C., nickel sulfate, cobalt sulfate, and manganese sulfate were mixed in water in an amount such that a molar ratio of nickel:cobalt:manganese was 40:30:30 to prepare a first transition metal-containing solution with a concentration of 2M, and nickel sulfate, cobalt sulfate, and manganese sulfate were mixed in water in an amount such that a molar ratio of nickel:cobalt:manganese was 80:10:10 to prepare a second transition metal-containing solution with a concentration of 2M. A container containing the first transition metal-containing solution was connected to the reactor, and a container containing the second transition metal-containing solution was connected to the container containing the first transition metal-containing solution. In addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0.

Subsequently, the first transition metal-containing solution, the NaOH aqueous solution, and the NH$_4$OH aqueous solution were respectively added at rates of 180 ml/hr, 180 ml/hr, and 10 ml/hr and reacted for 30 minutes to form seeds of nickel manganese cobalt-based composite metal hydroxide. Thereafter, amounts of NH$_4$OH and NaOH added were gradually decreased to reduce the pH at a rate of 2 per hour so that the pH was changed to 9.5, and, simultaneously, the second transition metal-containing solution was added to the container containing the first transition metal-containing solution at a rate of 150 ml/hr to induce the growth of nickel manganese cobalt-based composite metal hydroxide particles as well as the formation of a concentration gradient in the particles. Thereafter, the reaction was maintained for 24 hours to grow the nickel manganese cobalt-based composite metal hydroxide. The nickel manganese cobalt-based composite metal hydroxide particles thus formed were separated, washed with water, and then dried in an oven at 120° C. to prepare a precursor.

The prepared precursor was mixed with a lithium hydroxide, as a lithium raw material, at a molar ratio of 1:1.07 and then heat-treated at 300° C. for 10 hours, at 500° C. for 10 hours, and at 820° C. for 10 hours to prepare a positive electrode active material.

Example 2: Preparation of Positive Electrode Active Material Precursor

In a 5 L batch-type reactor set at 60° C., nickel sulfate, cobalt sulfate, manganese sulfate, and magnesium sulfate were mixed in water in an amount such that a molar ratio of nickel:cobalt:manganese:magnesium was 40:30:30:0.02 to prepare a first transition metal-containing solution with a concentration of 2M, and nickel sulfate, cobalt sulfate, manganese sulfate, and magnesium sulfate were mixed in water in an amount such that a molar ratio of nickel:cobalt:manganese:magnesium was 80:10:10:0.02 to prepare a second transition metal-containing solution with a concentration of 2M. A container containing the first transition metal-containing solution was connected to the reactor, and a container containing the second transition metal-containing solution was connected to the container containing the first transition metal-containing solution. In addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the first transition metal-containing solution, the NaOH aqueous solution, and the NH$_4$OH aqueous solution were respectively added at rates of 180 ml/hr, 180 ml/hr, and 10 ml/hr and reacted for 30 minutes to form seeds of a hydroxide of the first transition metal-containing solution. Thereafter, the pH was reduced at a rate of 2 per hour so that the pH was changed to 9.5, and, simultaneously, the second transition metal-containing solution was added to the container containing the first transition metal-containing solution at a rate of 150 ml/hr to induce the growth of hydroxide particles as well as the formation of a concentration gradient in the particles. Thereafter, the reaction was maintained for 24 hours to grow the nickel manganese cobalt-based composite metal hydroxide.

The nickel manganese cobalt-based composite metal hydroxide particles thus formed were separated, washed with water, and then dried in an oven at 120° C. to prepare a precursor.

The prepared precursor particles were mixed with a lithium hydroxide, as a lithium raw material, at a molar ratio of 1:1.07 and then heat-treated at 300° C. for 10 hours, at 500° C. for 10 hours, and at 820° C. for 10 hours to prepare positive electrode active materials, respectively.

Example 3: Preparation of Positive Electrode Active Material

The precursor particles prepared in Example 1 were mixed with a lithium hydroxide, as a lithium raw material, and tungsten oxide (IV) at a molar ratio of 1:1.07:0.005 and then heat-treated at 300° C. for 10 hours, at 500° C. for 10 hours, and at 820° C. for 10 hours under an oxygen atmosphere (oxygen partial pressure of 20%) to prepare a positive electrode active material including a tungsten-doped lithium composite metal oxide in which nickel, cobalt, and manganese in the lithium composite metal oxide were distributed while respectively having a concentration gradient.

Reference Example 1: Preparation of Positive Electrode Active Material

In a 5 L batch-type reactor set at 60° C., a transition metal-containing solution was prepared by respectively adding nickel sulfate, cobalt sulfate, and manganese sulfate in water so that a lithium transition metal oxide constituting a positive electrode active material had a composition of LiNi$_{0.6}$Mn$_{0.2}$Co$_{0.2}$O$_2$. In this case, a total concentration of the transition metal-containing solution in the aqueous solution was allowed to be 2M, and a container containing the transition metal-containing solution was connected to the reactor. In addition, a 4M NaOH solution and a 7% NH$_4$OH aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0.

Subsequently, the transition metal-containing solution, the NaOH aqueous solution, and the NH$_4$OH aqueous solution were respectively added at rates of 180 ml/hr, 180 ml/hr, and 10 ml/hr and reacted for 30 minutes to form seeds of a nickel manganese cobalt composite metal hydroxide. Thereafter, the pH was reduced at a rate of 2 per hour so that the pH was changed to 9.5, and the reaction was then maintained for 24 hours to grow the nickel manganese cobalt composite metal hydroxide.

The nickel manganese cobalt composite metal hydroxide particles thus formed were separated, washed with water, and then dried in an oven at 120° C. The prepared nickel manganese cobalt composite metal hydroxide particles were mixed with a lithium hydroxide, as a lithium raw material, at a molar ratio of 1:1.07 and then heat-treated at 850° C. for 15 hours to prepare a positive electrode active material.

Preparation Example: Manufacture of Lithium Secondary Batteries

Lithium secondary batteries were respectively manufactured by using the positive electrode active materials prepared in Examples 1 to 3 and Reference Example 1.

Specifically, each of the positive electrode active materials prepared in Examples 1 to 3 and Reference Example 1, a carbon black conductive agent, and a PVdF binder were mixed in an N-methylpyrrolidone solvent at a weight ratio of 95:2.5:2.5 to prepare a composition for forming a positive electrode (viscosity: 5,000 mPa·s), and an aluminum current collector was coated with the composition, dried at 130° C., and then rolled to prepared a positive electrode.

Also, as a negative electrode active material, natural graphite, a carbon black conductive agent, and a PVdF binder were mixed in an N-methylpyrrolidone solvent at a weight ratio of 85:10:5 to prepare a composition for forming a negative electrode, and a copper current collector was coated with the composition to prepared a negative electrode.

Each lithium secondary battery was manufactured by preparing an electrode assembly by disposing a porous polyethylene separator between the positive electrode and the negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Experimental Example 1: Structural Observation of Positive Electrode Active Material The precursor prepared in Example 1 was observed with a field emission scanning electron microscope (FE-SEM), and diameters and volumes of a core and a shell, and volume ratios in the precursor were respectively calculated from the observation results. The results thereof are presented in FIG. 2 and Table 1 below. Values in the following Table 1 were average values.

TABLE 1

|  | Length (μM) | Volume (μm$^3$) | Volume ratio in precursor (vol %) |
| --- | --- | --- | --- |
| Core | 0.94 (core radius) | 3.5 | 10.0 |
| Shell | 1.085 (shell thickness) | 31.3 | 90.0 |
| Total | 2.025 (precursor radius) | 34.8 | 100 |

Figure 3:
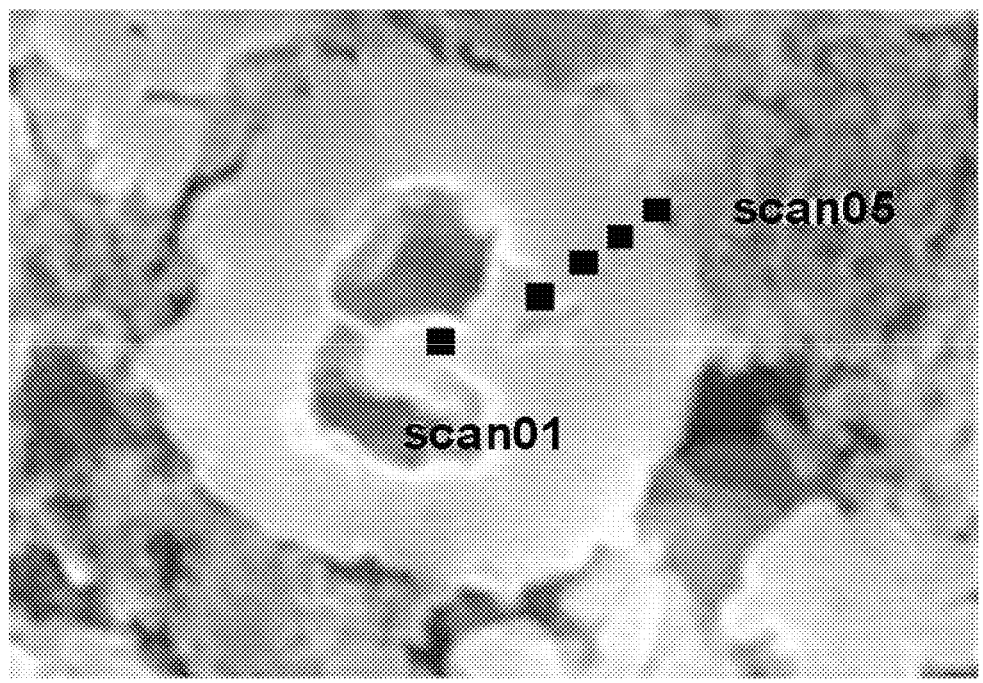
FIG. 3 is an FE-SEM image of a positive electrode active material prepared in Example 1 (observation magnification=30,000 times).

Also, the positive electrode active material prepared in Example 1 was processed by ion milling, and a cross-sectional structure of the positive electrode active material was then observed using a FE-SEM. The results thereof are presented in FIG. 3.

As a result of the observation of the cross-sectional structure, the formation of a buffer layer including a three-dimensional network structure in the core and the shell may be confirmed, and it may also be confirmed that particles in the shell had a crystal orientation from the center of the particle in a surface direction. Furthermore, a total particle diameter of the positive electrode active material was 4.3 μm, and, in an average radius of the positive electrode active material of 2.15 μm, an average radius of the core 1 was 0.4 μm, an average thickness of the buffer layer was 0.6 μm, and an average thickness of the shell 2 was 1.15 μm. As a result of calculating porosity by converting volume ratios from the above results, the porosity of the buffer layer 3 in the positive electrode active material was about 10 vol % based on the total thickness of the positive electrode active material.

Experimental Example 2: Analysis of Concentration Gradient in Positive Electrode Active Material Also, component analysis was performed on the precursor prepared in Example 1 using EPMA, and the results thereof are presented in Table 2 below.

TABLE 2

|  | Scan | Ni (mol %) | Co (mol %) | Mn (mol %) |
| --- | --- | --- | --- | --- |
| Core | 01 | 75 | 14 | 11 |
|  | 02 | 75 | 14 | 11 |
| Shell | 03 | 71 | 17 | 14 |
|  | 04 | 59 | 20 | 17 |
|  | 05 | 56 | 23 | 21 |
| Total |  | 61 | 22 | 17 |

Figure 2:
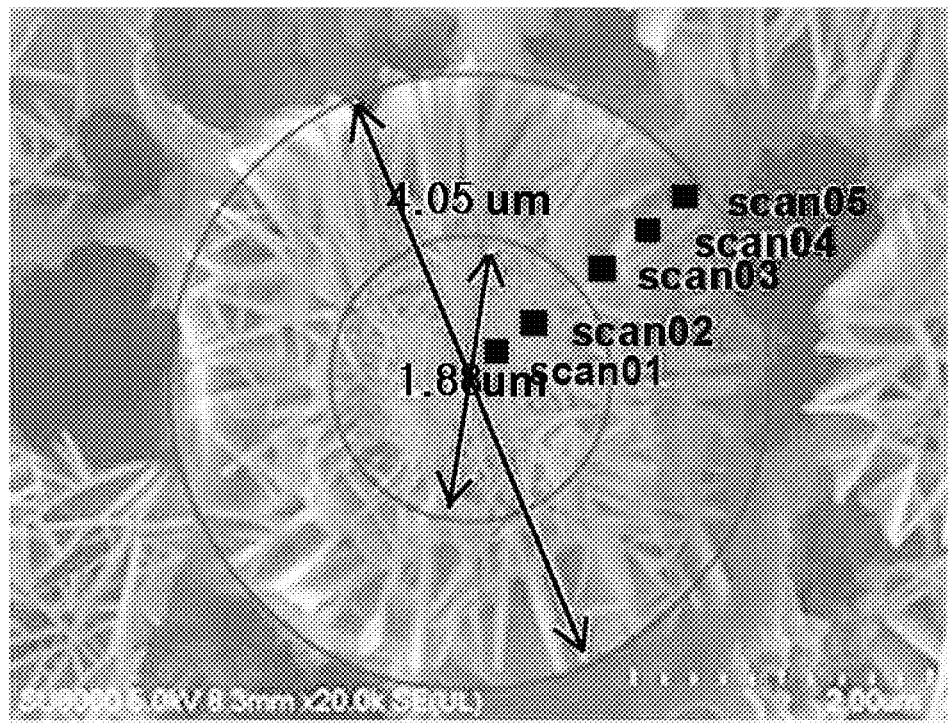
FIG. 2 is a field emission scanning electron microscope (FE-SEM) image of a precursor prepared in Example 1.

Positions of the scans in Table 2 were as illustrated in FIG. 2.

From the experimental results, it may be confirmed that the concentration of Ni was decreased and the concentrations of Co and Mn were increased from the center to the surface.

Component analysis was performed on the positive electrode active material prepared in Example 1 using EPMA, and the results thereof are presented in Table 3 below.

TABLE 3

|  | Scan | Ni (mol %) | Co (mol %) | Mn (mol %) |
|---|---|---|---|---|
| Core | 01 | 68 | 18 | 4 |
| Buffer layer | 02 | 65 | 20 | 8 |
| Shell | 03 | 62 | 21 | 12 |
|  | 04 | 60 | 22 | 16 |
|  | 05 | 58 | 24 | 19 |
| Total |  | 60 | 23 | 17 |

As illustrated in Table 3, it may be confirmed that Ni had a concentration gradient in which the concentration of the Ni was decreased from the center of the positive electrode active material to the surface thereof.

Experimental Example 3: Evaluation of Positive Electrode Active Material

The coin cells (use Li metal negative electrode) prepared using the positive electrode active materials prepared in Example 1 and Reference Example 1 were charged at a constant current (CC) of 0.1 C to a voltage of 4.25 V at 25° C., and thereafter, charge in the first cycle was performed by charging the coin cells at a constant voltage (CV) of 4.25 V to a current of 0.05 mAh. After the coin cells were left standing for 20 minutes, the coin cells were discharged at a constant current of 0.1 C to a voltage of 3.0 V. A cycle was defined as the above charge and discharge, and discharge capacity in the first cycle was measured. Thereafter, the discharge condition was changed to 2 C, and charge/discharge capacity, charge and discharge efficiency, and rate capability were respectively evaluated. The results thereof are presented in Table 4 below.

TABLE 4

| | First charge and discharge | | | 2 C rate | |
|---|---|---|---|---|---|
| | Charge capacity (mAg/g) | Discharge capacity (mAg/g) | Charge and discharge efficiency (%) | Capacity (mAg/g) | 2.0 C/ 0.1 C (%) |
| Example 1 | 196.3 | 180.9 | 92.1 | 162.8 | 89.9 |
| Reference Example 1 | 193.4 | 178.0 | 92.1 | 159.3 | 89.8 |

From the experimental results, the lithium secondary battery including the positive electrode active material of Example 1 had equivalent levels of the charge and discharge efficiency and rate capability, but had improved capacity characteristics in comparison to the lithium secondary battery including the positive electrode active material of Reference Example 1.

Experimental Example 4: Battery Characteristic Evaluation of Lithium Secondary Battery Battery characteristics of the lithium secondary batteries respectively including the positive electrode active materials of Example 1 and Reference Example 1 were evaluated by the following method.

Specifically, the lithium secondary batteries were charged and discharged at a temperature of 25° C. under conditions of 1 C/2 C within a driving voltage range of 2.8 V to 4.15 V. In this case, a cycle was defined as one charge and one discharge, and the charge and discharge cycle under the above conditions was repeated 800 times.

Also, in order to evaluate output characteristics, resistance was measured by charging the battery, which was charged and discharged at room temperature (25° C.), based on a SOC of 50%, and, at a low temperature (−30° C.), a width of the voltage drop when the current was applied was measured based on a SOC of 50%.

As a result, resistances at room temperature (25° C.) and low temperature (−30° C.), and capacity retention, as a ratio of discharge capacity in a $800^{th}$ cycle to initial capacity after the 800 cycles of charge and discharge at room temperature, were respectively measured. The results thereof are presented in Table 5 below.

TABLE 5

|  | Room temperature (25° C.) resistance (mohm) | Low temperature (−30° C.) resistance (mohm) | Capacity retention (%) at the $800^{th}$ cycle at room temperature (25° C.) |
|---|---|---|---|
| Example 1 | 1.25 | 1.15 | 95.4 |
| Reference Example 1 | 1.48 | 1.42 | 93.7 |

From the experimental results, with respect to the lithium secondary battery using the positive electrode active material prepared in Example 1, it may be confirmed that the output characteristics at room temperature and low temperature and cycle characteristics were excellent.

The invention claimed is:

1. A method of preparing a positive electrode active material for a secondary battery comprising:
    preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution;
    preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13;
    growing the nickel manganese cobalt-based composite metal hydroxide particles by adding an ammonium cation-containing complexing agent and a basic compound to the reaction solution until a pH of the reaction solution reaches 8 or more to less than 11; and
    mixing the grown nickel manganese cobalt-based composite metal hydroxide particles with a lithium-containing raw material and performing a heat treatment.

2. The method of claim 1, wherein the preparing of the reaction solution, in which nickel manganese cobalt-based composite metal hydroxide particles are formed, is performed in a temperature range of 40° C. to 70° C.

3. The method of claim 1, wherein the ammonium cation-containing complexing agent comprises one selected from the group consisting of $NH_4OH$, $(NH_4)_2SO_4$, $NH_4NO_3$, $NH_4Cl$, $CH_3COONH_4$, and $NH_4CO_3$, or a mixture of two or more thereof.

4. The method of claim 1, wherein the basic compound comprises one selected from the group consisting of a hydrate of alkali metal, a hydroxide of alkali metal, a hydrate of alkaline earth metal, and a hydroxide of alkaline earth metal, or a mixture of two or more thereof.

5. The method of claim 1, wherein the growing of the nickel manganese cobalt-based composite metal hydroxide particles is performed by changing a pH of a reactant at a rate of 1 per hour to 2.5 per hour.

6. The method of claim 1, wherein the heat treatment is performed in a temperature range of 250° C. to 1,000° C.

7. The method of claim 1, wherein the heat treatment is performed by a multi-stage heat-treatment method which comprises a first heat treatment at 250° C. to 450° C. for 5 hours to 15 hours, a second heat treatment at 450° C. to 600° C. for 5 hours to 15 hours, and a third heat treatment at 700° C. to 900° C. for 5 hours to 15 hours.

8. A method of preparing a precursor of a positive electrode active material for a secondary battery comprising:

preparing a first transition metal-containing solution including a nickel raw material, a cobalt raw material, and a manganese raw material and a second transition metal-containing solution including a nickel raw material, a cobalt raw material, and a manganese raw material in a concentration different from that of the first transition metal-containing solution;

preparing a reaction solution, in which nickel manganese cobalt-based composite metal hydroxide particles are formed, by adding an ammonium cation-containing complexing agent and a basic compound as well as the second transition metal-containing solution to the first transition metal-containing solution to allow a mixing ratio of the first transition metal-containing solution to the second transition metal-containing solution to be gradually changed from 100 vol %:0 vol % to 0 vol %:100 vol % and performing a co-precipitation reaction in a pH range of 11 to 13; and growing the nickel manganese cobalt-based composite metal hydroxide particles by adding an ammonium cation-containing complexing agent and a basic compound to the reaction solution until a pH of the reaction solution reaches 8 or more to less than 11.

\* \* \* \* \*